(12) United States Patent　　(10) Patent No.: US 12,188,453 B2
Putrams　　(45) Date of Patent: Jan. 7, 2025

(54) ARRANGEMENT FOR LOWERING AND RAISING SERVICE TOOLS USED FOR WIND TURBINE BLADE AND TOWER MAINTENANCE

(71) Applicant: AERONES, INC., San Jose, CA (US)

(72) Inventor: Janis Putrams, Riga (LV)

(73) Assignee: AERONES, INC., San Jose, CA (US)

( * ) Notice: Subject to any disclaimer, the term of this patent is extended or adjusted under 35 U.S.C. 154(b) by 0 days.

(21) Appl. No.: 17/915,599

(22) PCT Filed: Apr. 2, 2020

(86) PCT No.: PCT/IB2020/053139
§ 371 (c)(1),
(2) Date: Sep. 29, 2022

(87) PCT Pub. No.: WO2021/198734
PCT Pub. Date: Oct. 7, 2021

(65) Prior Publication Data
US 2023/0126777 A1　　Apr. 27, 2023

(51) Int. Cl.
*F03D 80/50*　　(2016.01)
*B63B 27/30*　　(2006.01)
(Continued)

(52) U.S. Cl.
CPC .............. *F03D 80/50* (2016.05); *B63B 27/30* (2013.01); *B63B 81/00* (2020.01); *B66C 23/207* (2013.01);
(Continued)

(58) Field of Classification Search
CPC .......... F03D 80/50; F03D 13/25; F03D 13/40; F03D 80/55; B63B 27/30; B63B 81/00;
(Continued)

(56) References Cited

U.S. PATENT DOCUMENTS

| 8,069,634 B2 | 12/2011 | Livingston et al. |
| 9,821,984 B2 | 11/2017 | Chin et al. |

(Continued)

FOREIGN PATENT DOCUMENTS

| KR | 101368675 B1 | 3/2014 |
| KR | 101999500 B1 | 7/2019 |
| WO | 2021/019274 | 2/2021 |

OTHER PUBLICATIONS

International Search report for PCT/IB2020/053139, prepared by the European Patent Office, mailing date Feb. 12, 2020, 3 pages.

*Primary Examiner* — Aaron R Eastman
(74) *Attorney, Agent, or Firm* — Brooks Kushman P.C.

(57) ABSTRACT

An offshore wind turbine blade and tower maintenance devices and systems, more particularly, to the system for service tools positioning relative to the offshore wind turbine blade and tower. An arrangement for lowering and raising service tools used for offshore wind turbine blade and tower maintenance, having: a truss system, a rigging and a rigging pulling in and letting out means. The truss system, includes booms, pivotally attached to a supporting means, which are adapted to be leaned against or releasably fixed to a wind turbine tower or wind turbine tower mooring elements; wherein the rigging and a rigging pulling in and letting out means are operably connected with the truss system, so to allow lowering and raising service tools used for offshore wind turbine blade and tower maintenance.

11 Claims, 5 Drawing Sheets

(51) Int. Cl.
  *B63B 81/00* (2020.01)
  *B66C 23/20* (2006.01)
  *F03D 13/25* (2016.01)

(52) U.S. Cl.
  CPC ...... *F03D 13/25* (2016.05); *F05B 2230/6102* (2013.01)

(58) Field of Classification Search
  CPC ........... B66C 23/207; F05B 2230/6102; F05B 2230/61; F05B 2240/916; Y02E 10/72; Y02E 10/727; Y02E 10/728; Y02P 70/50
  See application file for complete search history.

(56) References Cited

U.S. PATENT DOCUMENTS

| | | | | |
|---|---|---|---|---|
| 2006/0175465 A1* | 8/2006 | Teichert | ................ | B66C 23/207 244/33 |
| 2007/0290426 A1* | 12/2007 | Trede | ...................... | F03D 80/70 269/1 |
| 2011/0094987 A1* | 4/2011 | Botwright | ............... | B66C 23/62 212/270 |
| 2012/0217089 A1* | 8/2012 | Fenger | .................... | F03D 80/50 182/2.1 |
| 2014/0360015 A1* | 12/2014 | Lohan | ................... | F03D 1/0658 29/889.1 |
| 2015/0048043 A1* | 2/2015 | Laurens | ................. | B66C 23/207 212/270 |
| 2016/0146183 A1* | 5/2016 | Puls | ........................ | F03D 80/70 29/889.1 |
| 2019/0017495 A1* | 1/2019 | Johnson | ................... | F03D 80/50 |
| 2019/0032638 A1* | 1/2019 | Garitaonandia | ........ | F03D 13/20 |
| 2022/0348441 A1* | 11/2022 | Fenger | .................... | B66C 1/108 |
| 2023/0079878 A1* | 3/2023 | Fenger | .................... | B66C 13/08 212/276 |
| 2023/0303366 A1* | 9/2023 | Fenger | .................... | F03D 13/10 |
| 2023/0365383 A1* | 11/2023 | Chea | ....................... | F03D 13/10 |

* cited by examiner

ARRANGEMENT FOR LOWERING AND RAISING SERVICE TOOLS USED FOR WIND TURBINE BLADE AND TOWER MAINTENANCE

CROSS-REFERENCE TO RELATED APPLICATION

This application is the U.S. national phase of PCT Application No. PCT/IB2020/053139 filed on Apr. 2, 2020, the disclosure of which is incorporated in its entirety by reference herein.

TECHNICAL FIELD

The invention relates to offshore wind turbine blade and tower maintenance devices and systems, more particularly, to the system for service tools positioning relative to the offshore wind turbine blade and tower.

BACKGROUND ART

Wind turbine generators installed offshore present many advantages compared to wind turbine generators onshore. Some of these advantages are more steady wind at lower altitudes and no visual disturbance for the general public.

In the course of use wind turbine blades require constant maintenance. Bird strikes, lightning strikes, leading edge and surface erosion cause damage to wind turbine blades. Offshore wind turbine generators also have challenges of harsh salty environment. Damaged, faulty, dirty, or covered by ice wind turbine blades can reduce overall productivity of the wind turbine.

Operation and maintenance activities typically represent about 25-30% of the total lifecycle costs for offshore wind farms. Maintenance costs consist of direct costs of operations as well as lost profits because of downtime. Blade maintenance tasks include but are not limited to blade cleaning, inspection, lightning protection system conductivity measurement, drainage hole cleaning, and leading-edge repair.

Traditionally, offshore wind turbine blade inspection and maintenance are made by industrial climbers, who use rope and cradle access to get to the blade. However, safer, less expensive and less time-consuming solutions for wind turbine blade maintenance use robots or arrangements, which do not require presence of workers at heights.

Arrangements and systems for offshore and onshore wind turbine blade and tower maintenance differ considerably. The same applies for systems for lowering and raising service tools used for wind turbine blade and tower maintenance.

There is known a maintenance system for wind turbine tower located in the sea (U.S. Pat. No. 9,821,984 B2), said maintenance system comprising: a maintenance capsule for transporting freight and personnel to and from the wind turbine tower, the maintenance capsule comprising: a seaworthy watertight, floatable container, a crane assembly extendable from a wind turbine tower, the crane assembly including: a boom for extending from the wind turbine tower over the sea; and a movement structure extending along said boom; and a trolley movable along said movement structure for moving the capsule to and from the wind turbine tower apparatus.

There is known a method of erecting a high-elevation multiple-bay structural tower and associated wind turbine equipment on a foundation (WO2008088408). The method comprising the steps of: securing a base bay assembly to the foundation; attaching a ginpole to the base bay assembly; positioning an intermediate bay assembly on top of the base bay assembly using the ginpole; positioning a top bay assembly on top of the intermediate bay assembly using the ginpole; positioning an apparatus for lifting a wind turbine proximate the top bay assembly using the ginpole; and positioning a wind turbine on top of the top bay assembly using the apparatus for lifting a wind turbine.

There is known an arrangement for wind turbine blade and tower maintenance and a system for lowering and raising of the arrangement (PCT/IB2019/056393). The arrangement comprising: a central rod, three balancing rods, a central hub, at least one tool arm adapted to releasably fix one or more tools aimed for surface maintenance; and a tool arm motor adapted to adjust the angle of the tool arm in respect of the central rod, wherein: the central rod and three balancing rods are connected to the central hub; the tool arm is rotatably fixed to the central rod and/or to the central hub via tool arm motor drive; the three balancing rods, as well as central rod or the central hub are adapted to be connected to carrying and balancing ropes or cables. PCT/IB2019/056393 also discloses the system for onshore lowering and raising said arrangement, which however cannot be used offshore.

SUMMARY OF THE INVENTION

The claimed transportable arrangement is adapted for lowering and raising service tools used for offshore wind turbine blade and tower maintenance, in particular for lowering and raising the arrangement disclosed in PCT/IB2019/056393.

The claimed arrangement comprises a truss system, a rigging and a rigging pulling in and letting out means. The truss system, comprising booms, pivotally attached to a supporting means, which are adapted to be leaned against or releasably fixed to a wind turbine tower or wind turbine tower mooring elements; wherein the rigging and a rigging pulling in and letting out means are operably connected with the truss system, so to allow lowering and raising service tools used for offshore wind turbine blade and tower maintenance.

According to the preferred embodiment the elements of the rigging pulling in and letting out means are located on a wind turbine generator nacelle, a wind turbine generator platform and on a truss system. For a better understanding it should be noted that a wind turbine generator platform is mounted above the wind turbine generator mooring structure and below the level of a wind turbine generator blade tip, directed vertically towards a sea bottom. The wind turbine tower mooring elements can be one or more wharf posts, docking bumpers, fenders, fender tubes, and other equivalent structures.

The truss system, comprises two or three booms, the booms having two ends: a forward end and a rear end, wherein the forward ends of the booms are pivotally attached to a supporting means, which are adapted to be leaned against or releasably fixed to a wind turbine tower or wind turbine tower mooring elements. According to the preferred embodiment each boom comprises three truss segments: distal, middle and proximal. The opposite ends of the middle truss segment are hinged to the end of the proximal truss segment and to the end of the distal truss segment accordingly, so to allow the truss segments to be folded and unfolded.

The rigging comprising a carrying rope, the service tool lowering and raising arrangement's three positioning ropes and booms' hanging ropes. For the purpose of present disclosure, the term rope should be understood in its broad meaning, including cord, cable, tow, belt, sling and their equivalents.

The rigging pulling in and letting out means comprising: three positioning rope's winches, two of which are mounted at the rear ends of the booms and one positioning rope's winch, adapted to be releasably fixed to a wind turbine generator platform; hanging ropes' winches, mounted on, or adapted to be releasably fixed to a wind turbine generator platform; and a carrying rope's winch, mounted on, or adapted to be releasably fixed to a wind turbine generator nacelle. According to the invention the term "at the end(s) of the booms" should be understood as being mounted at any place from the very rear end of the boom to one tenth of the length of the boom from the rear end of the boom. According to another embodiment, instead of being fixed to the wind turbine generator platform, the hanging ropes' winches may be mounted on the forward and the rear ends of the booms.

End one of the carrying rope is adapted to be operably connected to the carrying rope's winch; end two of the carrying rope is adapted to be connected to the service tools used for wind turbine blade and tower maintenance; ends one of the positioning ropes are adapted to be connected to the side or lower part of the service tools; ends two of the two positioning ropes are adapted to be operably connected to respective positioning rope's winch and; ends one of the booms' hanging ropes are adapted to be releasably connected to the carrying rope and operably connected to the hanging ropes' winches, ends two of the booms' hanging ropes are adapted to be connected to the forward ends and the rear ends of the booms.

As carrying rope's winch can be used a transportable winch brought to a wind turbine generator, or a winch pre-installed on a wind turbine generator nacelle. The same applies to the hanging ropes' winch, which can be either a winch pre-installed on a wind turbine generator platform, or a portable winch brought to a wind turbine generator platform.

DETAILED DESCRIPTION OF THE INVENTION

Figure 1:
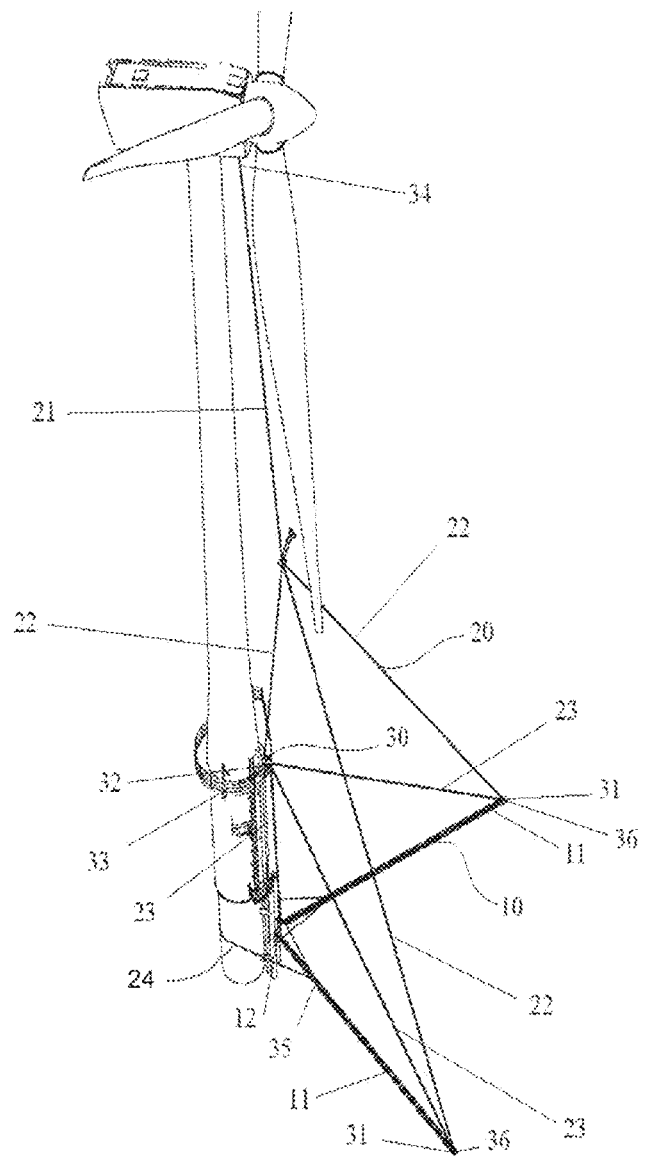
FIG. 1 shows general view of the proposed arrangement for lowering and raising service tools used for wind turbine blade and tower maintenance.

The arrangement for lowering and raising service tools used for offshore wind turbine blade and tower maintenance, comprising: a truss system 10, a rigging 20 and a rigging pulling in and letting out means 30 (FIG. 1). The truss system 10, comprising two or three booms 11, the booms having two ends: a forward end and a rear end. The forward ends of the booms 11 are pivotally attached to a supporting means 12, which are adapted to be leaned against or releasably fixed to a wind turbine tower or wind turbine tower mooring elements.

Figure 2:
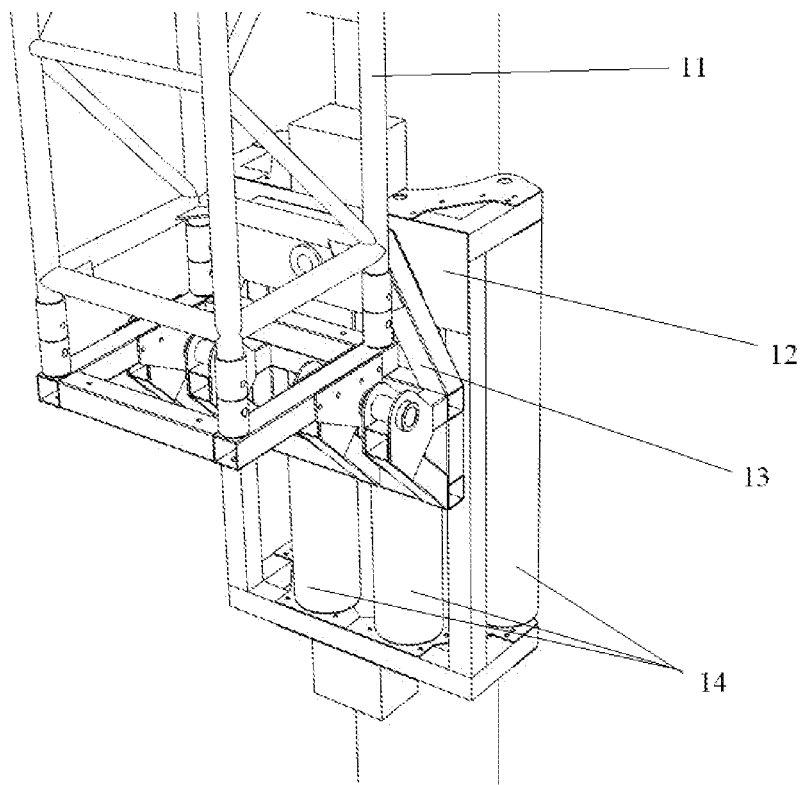
FIG. 2—a general view of the booms supporting means according to one embodiment, which are leaned against a wind turbine tower.

According to one embodiment, the supporting means 12 is a support plate or frame adapted to be leaned against a wind turbine tower or wind turbine tower mooring elements. The supporting means 12 may be provided with one or more electromagnets adapted to releasably fix the booms to a wind turbine tower or wind turbine tower mooring elements (FIG. 2). According to yet another embodiment the supporting means 12 may be a gripper adapted to be releasably fixed to a wind turbine tower or a wind turbine tower mooring element or elements. According to yet another embodiment the supporting means 12 is further provided with two hinges 13 to which the forward ends of the booms 11 are attached, wherein the hinges 13 are designed to provide two degrees of freedom for the booms 11: roll and pitch (FIG. 2). According to yet another embodiment the supporting means 12 further comprises roller supports 14 adapted to be leaned against a wind turbine tower or wind turbine tower mooring elements and designed to allow movement of the supporting means 12 in a horizontal plane, along the surface of the wind turbine tower, while the supporting means 12 is not releasably fixed to the wind turbine tower or wind turbine tower mooring elements (FIG. 2).

The rigging 20 comprising a carrying rope 21, the service tool lowering and raising arrangement's three positioning ropes 22 and booms' hanging ropes 23.

The rigging pulling in and letting out means 30 comprising: the positioning rope's winches 31, two of which are mounted at the rear ends of the booms 11 and one positioning rope's winch 32, adapted to be releasably fixed to a wind turbine generator platform (in the embodiment with three booms 11 the all three winches are mounted on the booms 11); a hanging ropes' winches 33, mounted on, or adapted to be releasably fixed to a wind turbine generator platform; and a carrying rope's winch 34, mounted on, or adapted to be releasably fixed to a wind turbine generator nacelle; wherein end one of the carrying rope 21 is adapted to be operably connected to the carrying rope's winch 34; end two of the carrying rope 21 is adapted to be connected to the service tools used for wind turbine blade and tower maintenance; ends one of the positioning ropes 22 are adapted to be connected to the side or lower part of the service tools; ends two of the two positioning ropes 22 are adapted to be operably connected to respective positioning rope's winch 31 and 32.

Ends one of the booms' hanging ropes 23 are adapted to be operably connected to the hanging ropes' winches 33, ends two of the booms' hanging ropes 23 are adapted to be connected to the forward ends and the rear ends of the booms 11.

According to yet another embodiment each boom 11 comprises three truss segments: distal, middle and proximal, wherein the opposite ends of the middle truss segment are hingedly connected to the end of the proximal truss segment and to the end of the distal truss segment accordingly, so to allow the truss segments to be folded and unfolded. The hinges between the truss segments are designed to allow releasably blocking hinge pivotal operation as a hinge, thus ensuring fixing truss segments at least in unfolded position.

The rigging 20 may further comprise a booms' fixing rope 24 and a boom fixing rope's winch 35 mounted on the proximal part of one boom 11, or two boom fixing rope's winches 35—one on the proximal part of each boom 11. The booms' fixing rope 24 is adapted to be fixed to the booms 11 and to the wind turbine tower or its elements, thus preventing booms' 11 substantial movement in horizontal plane.

The positioning rope's winches 31, mounted on the booms 11 may be located substantially at the center of the booms 11, where the rigging pulling in and letting out means 30 further may comprise a rolling means 36 (such as a pulley, a block or a roller), located at the rear ends of the booms 11, wherein the ends of the two respective positioning ropes 22 are adapted to be operably connected to respective positioning rope's winch 31 through the rolling means 36.

The hanging ropes' winches 33 may be mounted on the forward and the rear ends of the booms 11.

According to the preferred embodiment the truss system 10 is adapted to be conveniently placed on a waterborne vessel, is adapted to be attached to the docking structure of a wind turbine tower and is adapted to be expandable with about 120 degrees between the booms 11.

Figure 3:
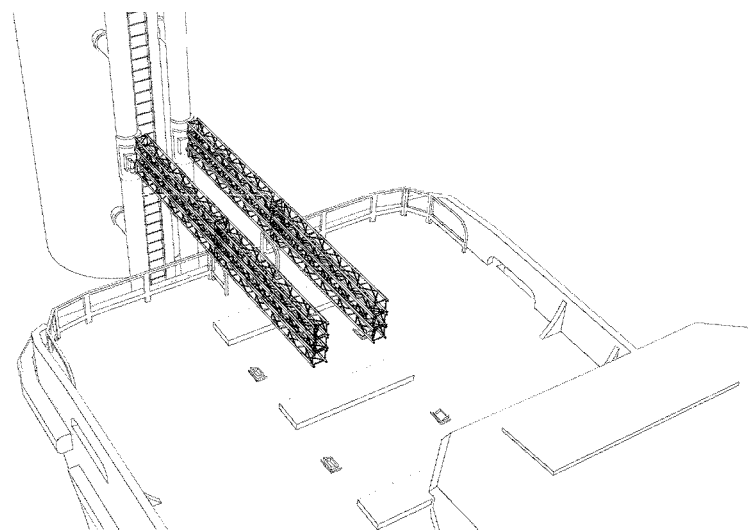
FIG. 3—a schematic view of the arrangement in preparation for operation according to one embodiment, where the supporting means of the folded truss system are leaned against or releasably fixed to wind turbine tower mooring elements.
Figure 4:
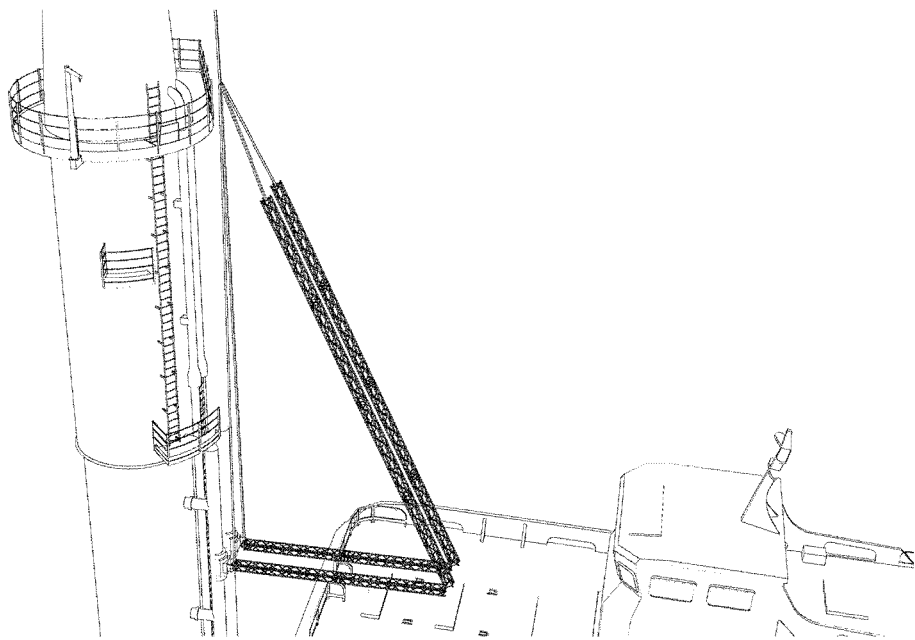
FIG. 4—a schematic view of the arrangement in preparation for operation according to one embodiment, where the middle and distal truss segments are being partially unfolded.
Figure 5:
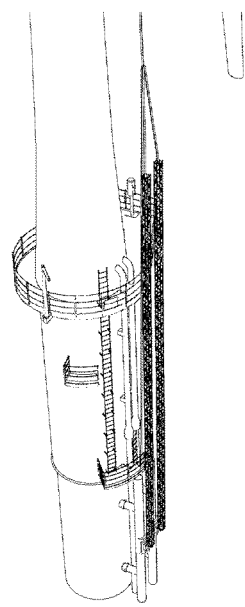
FIG. 5—a schematic view of the arrangement in preparation for operation according to one embodiment, where the truss system is being unfolded and held in substantially vertical position, while keeping truss system supporting means fixed to the wind turbine tower mooring elements.
Figure 6:
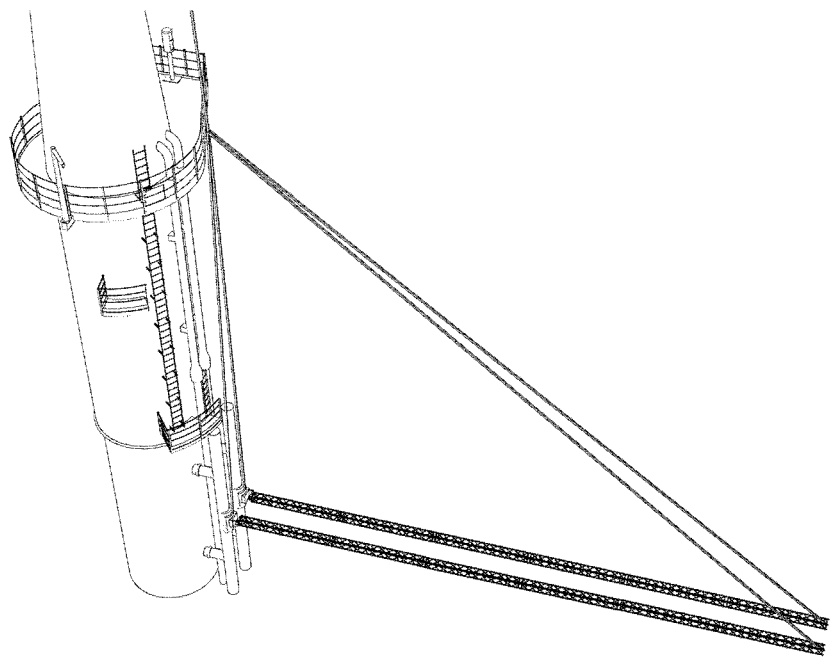
FIG. 6—a schematic view of the arrangement in preparation for operation according to one embodiment, where the truss system is being unfolded and held in substantially horizontal position.
Figure 7:
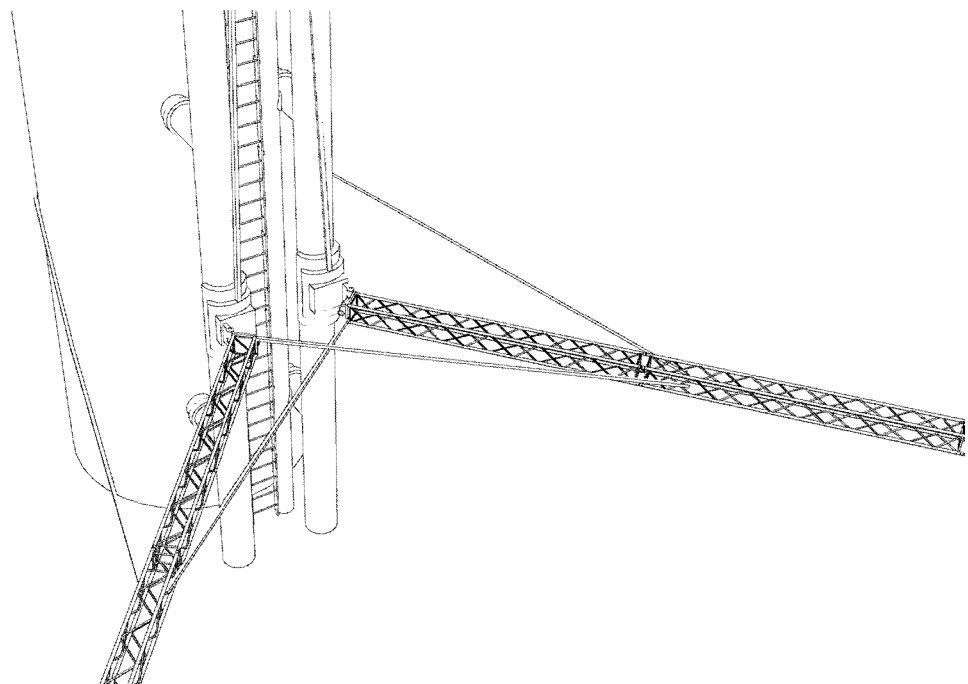
FIG. 7—a schematic view of the arrangement in preparation for operation according to one embodiment, where booms in substantially horizontal position are being moved in horizontal plane into working position.
Figure 8:
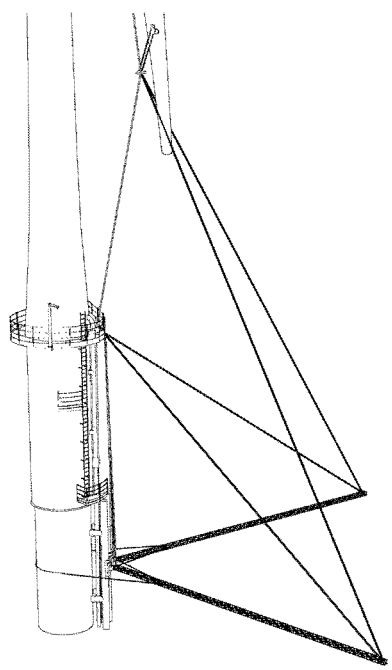
FIG. 8—a schematic view of the arrangement in operation with truss system, rigging and a rigging pulling in and letting out means in place and the service tools raised for serving the wind turbine generator blade.

The arrangement according to one embodiment operates as follows. A waterborne vessel is used to deliver the truss system 10, optionally with already integrated rigging 20 and a rigging pulling in and letting out means 30, to offshore wind turbine generator. The arrangement setup process is divided into several steps. A waterborne vessel approaches wind turbine tower and aims for the wind turbine tower mooring elements. The vessel centers on the turbine tower or wind turbine tower mooring elements and maintains pushing pressure (FIG. 3). Cargo and the service tools are lifted from the vessel to the wind turbine generator platform. The supporting means on the booms 11 forward ends are leaned against or releasably fixed to a wind turbine tower or wind turbine tower mooring elements. The carrying rope 21 is lowered from the nacelle and attached to rear ends of the booms 11. The carrying rope's winch 34 lifts ends of the booms 11 and unfolds them vertically (FIG. 4-5). The vessel leaves the wind turbine. The booms 11 are stiffened at hinge points and lowered to a horizontal position (FIG. 6). The unfolded booms 11 are spread from each other to form an angle of e.g. 120 degrees (FIG. 7). The booms' hanging ropes 23 from the wind turbine's platform are holding the booms 11 (FIG. 8). The carrying rope's winch 34 and the carrying rope 21 is used to lift and operate the service tools used for wind turbine blade and tower maintenance, while the positioning rope's winches 31 and 32, as well as positioning ropes 22 are used to position the service tools.

The takedown process according to one embodiment is as follows. The service tools are lowered to the wind turbine generator platform. The carrying rope 21 is attached to the hanging ropes 23, which are attached to the to the booms' 11 rear ends. The booms' 11 rear ends are lifted until the booms 11 achieve near vertical position. Hinges between the boom's 11 segments are de-stiffened and the boom's 11 folding process starts as carrying rope's winch 34 lowers the booms' 11 rear ends. A waterborne vessel approaches the wind turbine tower and docks to the wind turbine tower mooring elements. The booms 11 are lowered and folded on the deck of the vessel. After removing of the rigging 20 the truss system 10 is detached from the wind turbine tower. Cargo and service tools are lowered from the wind turbine generator platform to the vessel. The vessel departs from the wind turbine generator.

According to the preferred embodiment the winches of the rigging pulling in and letting out means 30 use torque or heave compensation modes when lifting or lowering equipment from the vessel to avoid any damage that could be created by vessel movement.

The proposed arrangement ensures effective positioning on an offshore wind turbine of a service tools used for turbine blade and tower maintenance. Its design allows convenient transportation of the arrangement to and from an offshore wind turbine tower even on a small waterborne vessel. One additional benefit of the preferred embodiment is that the space between the booms 11 is always left open (FIGS. 3 and 7) so in case of emergency the vessel can dock to the wind turbine tower and rescue personnel.

The invention claimed is:

1. An arrangement for lowering and raising service tools used for offshore wind turbine blade and tower maintenance, the arrangement comprising:
    a truss system;
    a rigging; and
    a rigging pulling in and letting out means;
    the truss system comprising two booms, the booms having forward end and a rear end, wherein the forward ends of the booms are pivotally attached to a supporting means, the supporting means being adapted to be leaned against or releasably fixed to a wind turbine tower or wind turbine tower mooring elements;
    the rigging and the rigging pulling in and letting out means being operably connected with the truss system, so to allow lowering and raising service tools used for offshore wind turbine blade and tower maintenance;
    the rigging comprising a carrying rope, three positioning ropes, and booms' hanging ropes;
    the rigging pulling in and letting out means comprising first, second, and third positioning rope's winches, the first and the second positioning rope's winches are mounted at the rear ends of the booms and the third positioning rope's winch is adapted to be releasably fixed to a wind turbine generator platform;
    the rigging pulling in and letting out means further comprising hanging ropes' winches, mounted on, or adapted to be releasably fixed to a wind turbine generator platform, and a carrying rope's winch, mounted on, or adapted to be releasably fixed to a wind turbine generator nacelle;
    wherein a first end of the carrying rope is adapted to be operably connected to the carrying rope's winch, a second end of the carrying rope is adapted to be connected to the service tools used for offshore wind turbine blade and tower maintenance, first ends of the positioning ropes are adapted to be connected to a side or lower part of the service tools, and second ends of first and second ones of the positioning ropes are adapted to be operably connected to respective positioning rope's winches; and first ends of the booms' hanging ropes are adapted to be operably connected to the hanging ropes' winches, and second ends of the booms' hanging ropes are adapted to be connected to the forward ends and the rear ends of the booms.

2. The arrangement according to claim 1, wherein each boom comprises three truss segments: distal, middle, and proximal, wherein the opposite ends of the middle truss segment are hingedly connected to the end of the proximal truss segment and to the end of the distal truss segment accordingly, so to allow the truss segments to be folded and unfolded.

3. The arrangement according to claim 1, wherein the supporting means is a support plate or frame adapted to be leaned against the wind turbine tower or the wind turbine tower mooring elements.

4. The arrangement according to claim 3, wherein the supporting means is further provided with two hinges to which the forward ends of the booms are attached, wherein the hinges are designed to provide two degrees of freedom for the booms.

5. The arrangement according to claim 4, wherein the supporting means further comprises roller supports adapted to be leaned against the wind turbine tower or the wind turbine tower mooring elements and designed to allow movement of the supporting means in a horizontal plane, along a surface of the wind turbine tower, while the supporting means is not releasably fixed to the wind turbine tower or the wind turbine tower mooring elements.

6. The arrangement according to claim 3, wherein the supporting means is provided with one or more electromagnets adapted to releasably fix the booms to a wind turbine tower or wind turbine tower mooring elements.

7. The arrangement according to claim 1, wherein the supporting means is a gripper adapted to be releasably fixed to the wind turbine tower or at least one of the wind turbine tower mooring elements.

8. The arrangement according to claim 1, wherein the rigging comprises either (i) a booms' fixing rope and a boom fixing rope's winch mounted on a proximal part of one boom, or (ii) two boom fixing rope's winches respectively mounted on the proximal part of each boom.

9. The arrangement according to claim 1, wherein the positioning rope's winches, mounted on the booms are located substantially at a center of the booms, where the rigging pulling in and letting out means further comprise a rolling means located at the rear ends of the booms, wherein the second ends of the two respective positioning ropes are adapted to be operably connected to respective positioning rope's winches through the rolling means.

10. The arrangement according to claim 1, wherein the hanging ropes' winches are mounted on the forward and the rear ends of the booms.

11. The arrangement according to claim 1, wherein the truss system is adapted to be placed on a waterborne vessel.

* * * * *